(12) United States Patent
Arai et al.

(10) Patent No.: US 10,647,330 B2
(45) Date of Patent: May 12, 2020

(54) VEHICLE CONTROLLER

(71) Applicant: HONDA MOTOR CO., LTD., Tokyo (JP)

(72) Inventors: Kentaro Arai, Wako (JP); Masayuki Sadakiyo, Wako (JP); Hisashi Ishikawa, Wako (JP); Takashi Adachi, Wako (JP); Tomoyuki Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/198,246

(22) Filed: Nov. 21, 2018

(65) Prior Publication Data
US 2019/0152491 A1     May 23, 2019

(30) Foreign Application Priority Data

Nov. 23, 2017  (JP) ................................ 2017-225290

(51) Int. Cl.
*B60W 50/08*     (2020.01)
*G05D 1/00*      (2006.01)
*B60W 10/04*     (2006.01)
*B60W 10/20*     (2006.01)

(52) U.S. Cl.
CPC .......... *B60W 50/082* (2013.01); *B60W 10/04* (2013.01); *B60W 10/20* (2013.01); *G05D 1/0061* (2013.01); *G05D 1/0088* (2013.01); *B60W 2540/04* (2013.01); *B60W 2710/20* (2013.01); *B60W 2720/106* (2013.01); *G05D 2201/0213* (2013.01)

(58) Field of Classification Search
CPC ... B60W 50/082; B60W 30/19; G05D 1/0061
USPC .......................................................... 701/23
See application file for complete search history.

(56) References Cited

U.S. PATENT DOCUMENTS

2016/0207536 A1*   7/2016   Yamaoka ............ B60W 30/182

FOREIGN PATENT DOCUMENTS

JP       2015182525 A   * 10/2015
JP       2017-146819 A    8/2017

OTHER PUBLICATIONS

Office Action dated Aug. 6, 2019, issued in counterpart JP application No. 2017-225290, with English translation. (6 pages).

* cited by examiner

*Primary Examiner* — Isaac G Smith
(74) *Attorney, Agent, or Firm* — Western, Hattori, Daniels & Adrian, LLP

(57) ABSTRACT

If an automated drive release request to release the automated drive mode and switch to the manual drive mode is made while the vehicle is travelling in an automated drive mode, a traveling control unit performs control that gradually shifts a vehicle driving force from the vehicle driving force in the automated mode to the vehicle driving force requested by the driver in the manual drive mode.

5 Claims, 11 Drawing Sheets

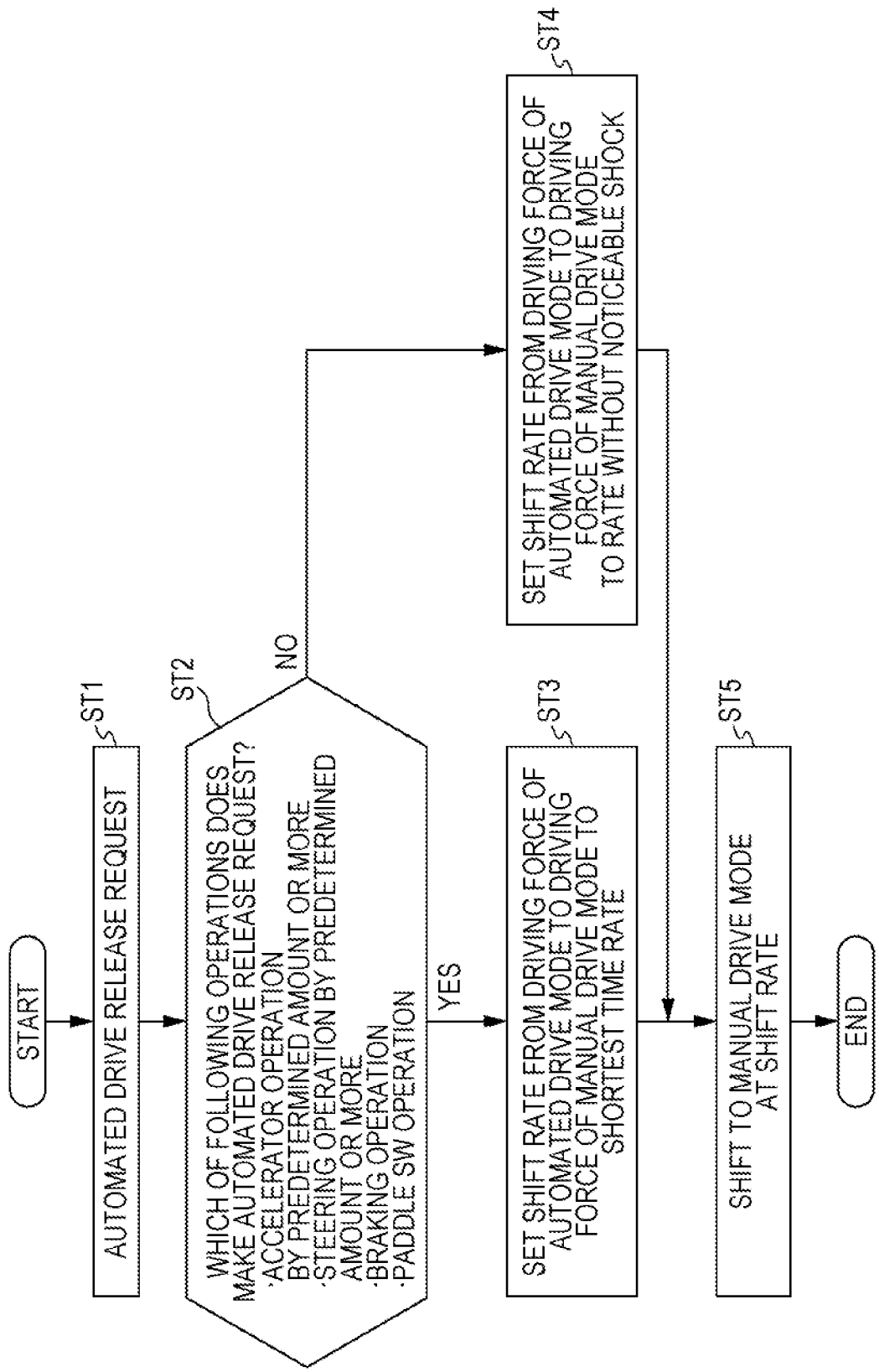

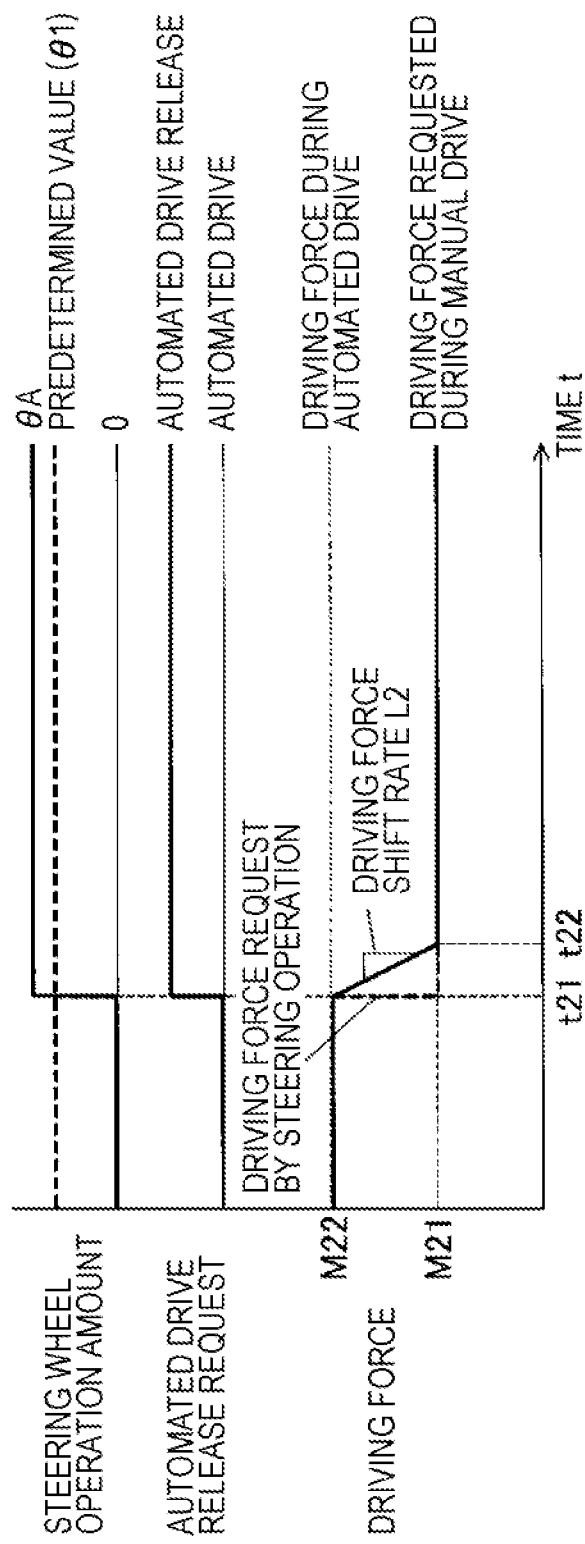

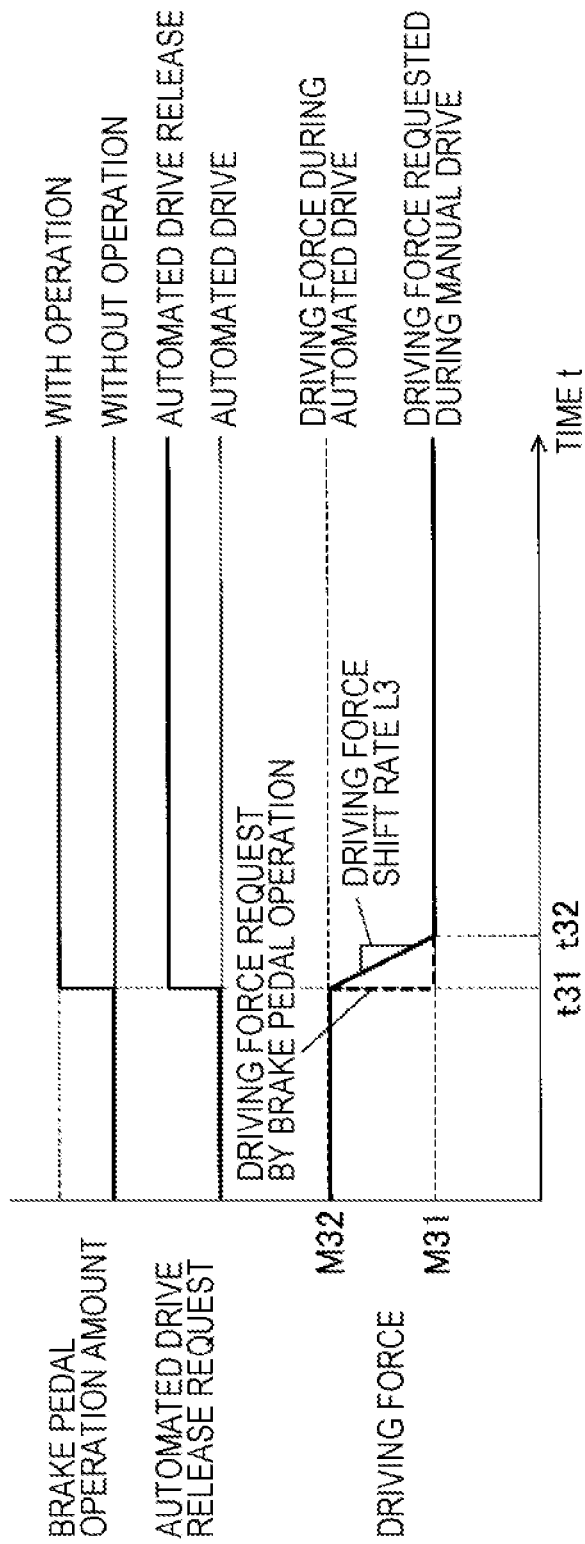

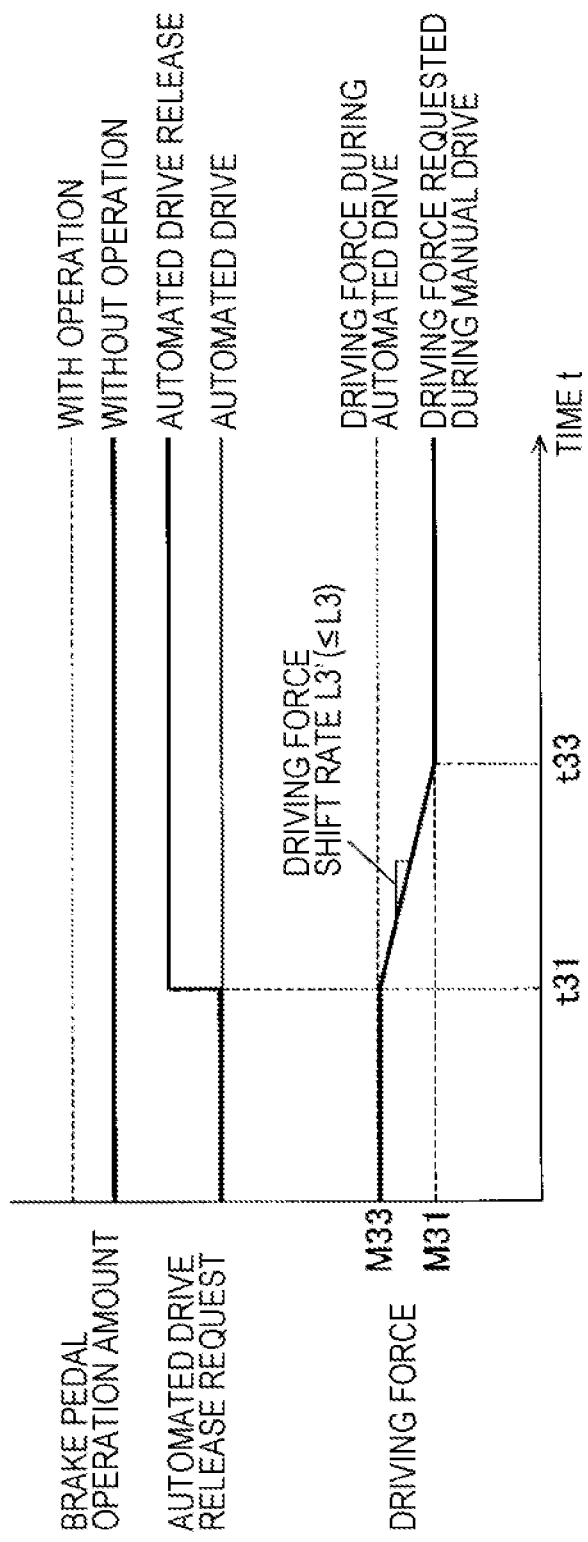

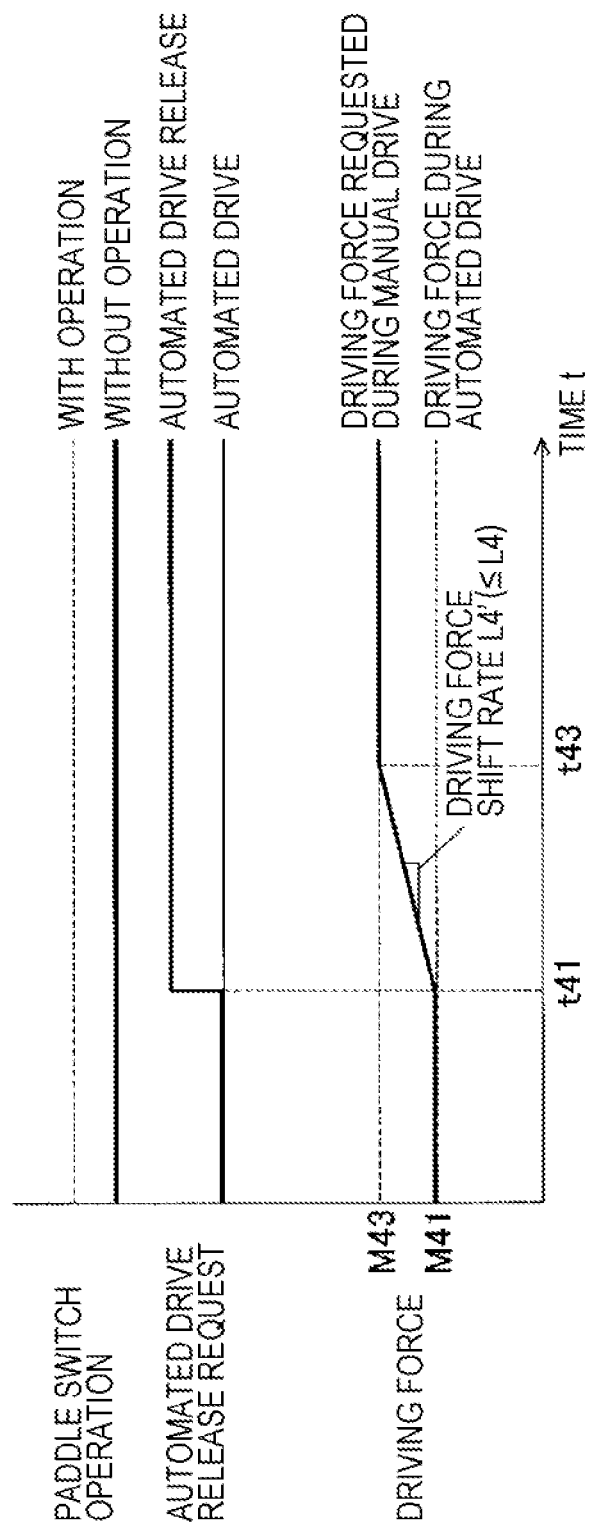

VEHICLE CONTROLLER

CROSS REFERENCES TO RELATED APPLICATIONS

The present application claims priority under 35 U.S.C. § 119 to Japanese Patent Application No. 2017-225290, filed in Japan on Nov. 23, 2017, entitled "Vehicle Controller." The contents of this application are incorporated herein by reference in their entirety.

BACKGROUND

1. Field

The present invention relates to a vehicle controller, and more specifically to a vehicle controller configured to perform automated drive control that automatically controls at least one of acceleration/deceleration and steering of a host vehicle.

2. Description of the Related Art

Conventionally, as disclosed in Japanese Unexamined Patent Application Publication No. 2017-146819, there is a vehicle controller including an automated drive control unit that automatically controls at least one of acceleration/deceleration and steering of a host vehicle so that the host vehicle can drive along a route to a destination.

When switching an automated drive mode to a manual drive mode while a vehicle is traveling, the vehicle controller under automated drive control as described above needs to shift a vehicle driving force from the vehicle driving force in the automated drive mode to the vehicle driving force requested by the driver in the manual drive mode. In this case, if there is a big difference between the vehicle driving force in the automated drive mode and the vehicle driving force requested by the driver in the manual drive mode, for example, an excessively high shift rate (change rate) of the driving force may result in the occurrence of large vibrations or noise in a driving force transmission mechanism including a transmission or the like during the shift, and affect the ride quality of the vehicle and the like. Therefore, there is a need to smoothly complete switching of a drive mode by shifting the driving force without generating such vibrations or noise.

Meanwhile, there is a case where the driver performs an operation such as an operation of accelerator pedal or a brake pedal, an operation of a steering wheel, or an operation of a paddle while the vehicle is traveling under the automated drive mode, or performs any of these operations after making an automated drive release request to release the automated drive mode and switch to the manual drive mode. Such an operation is likely to be a request made by the driver who desires to promptly control steering or acceleration/deceleration of the vehicle on his/her own will. In such a case, it is desirable that the shift to the vehicle driving force requested by the driver in the manual drive mode be completed as early as possible.

SUMMARY

In light of the points described above, it is desirable to provide a vehicle controller capable of, in the case of shifting a vehicle driving force in an automated drive mode to a vehicle driving force requested by the driver in a manual drive mode, shifting the driving force without generating excessive vibrations or noise in the vehicle to thereby smoothly complete switching between the drive modes, and thus achieving both smooth shift of the driving force and responsiveness to a driver's request.

To solve the above-mentioned problems, in one aspect of the present invention, a vehicle controller (100) is capable of switchably performing an automated drive mode and a manual drive mode, the automated drive mode automatically controlling at least acceleration/deceleration out of steering and the acceleration/deceleration of a vehicle (1), the manual drive mode controlling the at least acceleration/deceleration out of the steering and the acceleration/deceleration of the vehicle (1) according to an operation of a driver, the vehicle controller including a traveling control unit (120) that outputs a traveling control command value including at least a vehicle driving force command value. Here, when an automated drive release request to release the automated drive mode and switch to the manual drive mode is made while the vehicle is traveling in the automated drive mode, the traveling control unit (120) performs control that gradually shifts a vehicle driving force from the vehicle driving force in the automated drive mode to the vehicle driving force requested by the driver in the manual drive mode.

According to the vehicle controller according to one embodiment of the present invention, the vehicle driving force in the automated drive mode is gradually shifted to the driving force requested by the driver in the manual drive mode when the automated drive release request to release the automated drive mode and switch to the manual drive mode is made while the vehicle is travelling in the automated drive mode. Thus, even in the case such as one where there is a difference between an accelerator position in the automated drive mode and the accelerator position according to the operation of the driver in the manual drive mode, in particular, it is possible to prevent a sharp change in the vehicle driving force from occurring in the switching from the automated drive mode to the manual drive mode. Therefore, it is possible to prevent generation of large vibrations or noise in the vehicle due to the sharp change in the driving force in the shift from the automated drive to the manual drive. This allows the vehicle driver to take over the operation of the vehicle smoothly and naturally when the automated drive control switches to the manual drive control.

In addition, in the vehicle controller according to another embodiment of the present invention, it is preferable that the vehicle controller includes an operation member (70, 72, 74, or 65) with which the driver inputs an operation to control the acceleration/deceleration or the steering of the vehicle. Here, a shift rate is changed according to whether or not an operation of the operation member itself is performed by the driver or whether or not the operation of the operation member is performed in a predetermined amount or more.

If the operation of the operation member itself is performed by the driver or if the operation of the operation member is performed in the predetermined amount or more, the operation is likely to be a request made by the driver who desires to control the steering or the acceleration/deceleration of the vehicle on his/her own will immediately. Thus, it is desirable to shift to the driving force requested by the driver of the vehicle in the manual drive mode at a higher rate than in the case where any of those operations does not take place. On the other hand, if the operation of the operation member itself is not performed by the driver, or if the operation of the operation member is not performed in the predetermined amount or more, it can be determined that the driver does not make such request. Thus it is possible to smoothly shift the driving force without generating large vibrations or noise or the like in a driving force transmission path, by shifting to the driving force requested by the vehicle driver in the manual drive mode at a lower rate than in the case where those operations take place. Hence, as described above, if the shift rate is changed according to whether or not the operation of the operation member itself is performed by the driver or whether or not the operation of the operation member is performed in the predetermined amount or more, it is possible to achieve both responsiveness to the driver's request and smooth shift of the driving force.

In addition, in the vehicle controller according to another embodiment of the present invention, it is preferable that if the operation of the operation member itself is performed or if the operation of the operation member is performed in a predetermined amount or more, the vehicle driving force is shifted to the vehicle driving force requested by the driver at a higher rate than in a case where any of those operations does not take place.

If the operation of the operation member itself is performed or if the operation of the operation member is performed in the predetermined amount or more, it is possible to ensure the responsiveness to the driver's request by shifting to the driving force requested by the vehicle driver at the higher rate than in the case where any of those operations does not take place (responsiveness priority).

In addition, in the vehicle controller according to another embodiment of the present invention, it is preferable that if the operation of the operation member itself is not performed or if the operation of the operation member is not performed in a predetermined amount or more, the vehicle driving force is shifted to the vehicle driving force requested by the driver at a lower rate than in the case where any of those operations takes place.

If the operation of the operation member itself is not performed or if the operation of the operation member is not performed in the predetermined amount or more, it is possible to ensure the responsiveness to the driver's request and smoothly shift the driving force by shifting to the driving force requested by the vehicle driver at a lower rate than in the case where any of those operations is performed.

In addition, in the vehicle controller according to another embodiment of the present invention, it is preferable that the operation member is any of an accelerator operation member (70) for operating an accelerator position of the vehicle, a steering operation member (74) for operating the steering of the vehicle, a shift operation member (60) for selecting one of traveling ranges of the vehicle, and a brake operation member (72) for operating a brake of the vehicle, the operation of the operation member itself is an operation of the shift operation member (60) or an operation of the brake operation member (72), and the operation of the operation member in the predetermined amount or more is an operation of the accelerator operation member (70) in a predetermined amount or more or an operation of the steering operation member (74) in a predetermined amount or more.

If the shift operation member is operated, the operation is considered as the sign the driver has an intention to change the driving force by changing the traveling range of the vehicle. In addition, if the brake operation member is operated, the operation is considered as the sign that the driver has an intention to decelerate the vehicle. Furthermore, if the accelerator operation member is operated by the predetermined amount or more (predetermined AP or more), the operation is considered as the sign the driver has an intention to rapidly increase the driving force of the vehicle. In addition, if the steering operation member is operated by the predetermined amount or more (steering operation is performed at predetermined time or more), the operation is considered as the sign that the driver has an intention to increase a steering angle of the vehicle to some extent to rapidly change a direction of movement of the vehicle. Therefore, in the case where any of these operations is performed, it is necessary to ensure the responsiveness to the driver's request by shifting to the driving force requested by the vehicle driver in the manual drive mode at a higher rate than in the case where none of these operations is performed.

In addition, in the vehicle controller according to another embodiment of the present invention, it is preferable that the vehicle controller determines that the automated drive release request is made if the operation of the operation member itself is performed or the operation of the operation member is performed in the predetermined amount or more when the automated drive mode is selected.

As described above, if the operation of the operation member itself is performed or the operation of the operation member is performed in the predetermined amount or more when the automated drive mode is selected, the operation is likely to be a request made by the driver who desires to control the steering or the acceleration/deceleration of the vehicle on his/her own will immediately. Therefore, if any of these operations is performed when the automated drive mode is selected, it is desirable to determine that the automated drive release request is made, and switch from the automated drive mode to the manual drive mode.

In addition, in the vehicle controller according to another embodiment of the present invention, it is preferable that the vehicle driving force requested by the driver in the manual drive mode is determined according to an operation amount of the operation member by the driver.

If the driving force requested by the driver is determined according to the amount of the operation of the operation member by the driver, the driving force requested by the vehicle driver in the manual drive mode can be appropriately determined.

Note that above symbols in parenthesis represent drawing reference numbers of corresponding components in embodiments to be described below.

According to the vehicle controller according to another embodiment of the present invention, in the case of shifting the vehicle driving force in the automated drive mode to the vehicle driving force requested by the driver in the manual drive mode, it is possible to complete the switching between the drive modes by shifting the driving force without generating excessive vibrations or noise in the vehicle. In addition, it is also possible to achieve both the responsiveness to the driver's request and smooth shift of the driving force.

BRIEF DESCRIPTION OF THE DRAWINGS

FIG. 3 is a flowchart for illustrating a procedure of driving force shift control.

FIGS. 5A and 5B each are a graph showing the shift rate of the driving force according to the operation of a steering wheel.

FIGS. 6A and 6B each are a graph showing the shift rate of the driving force according to the operation of a brake pedal.

FIGS. 7A and 7B each are a graph showing the shift rate of the driving force according to the operation of a paddle switch.

DESCRIPTION OF THE PREFERRED EMBODIMENTS

Figure 1:
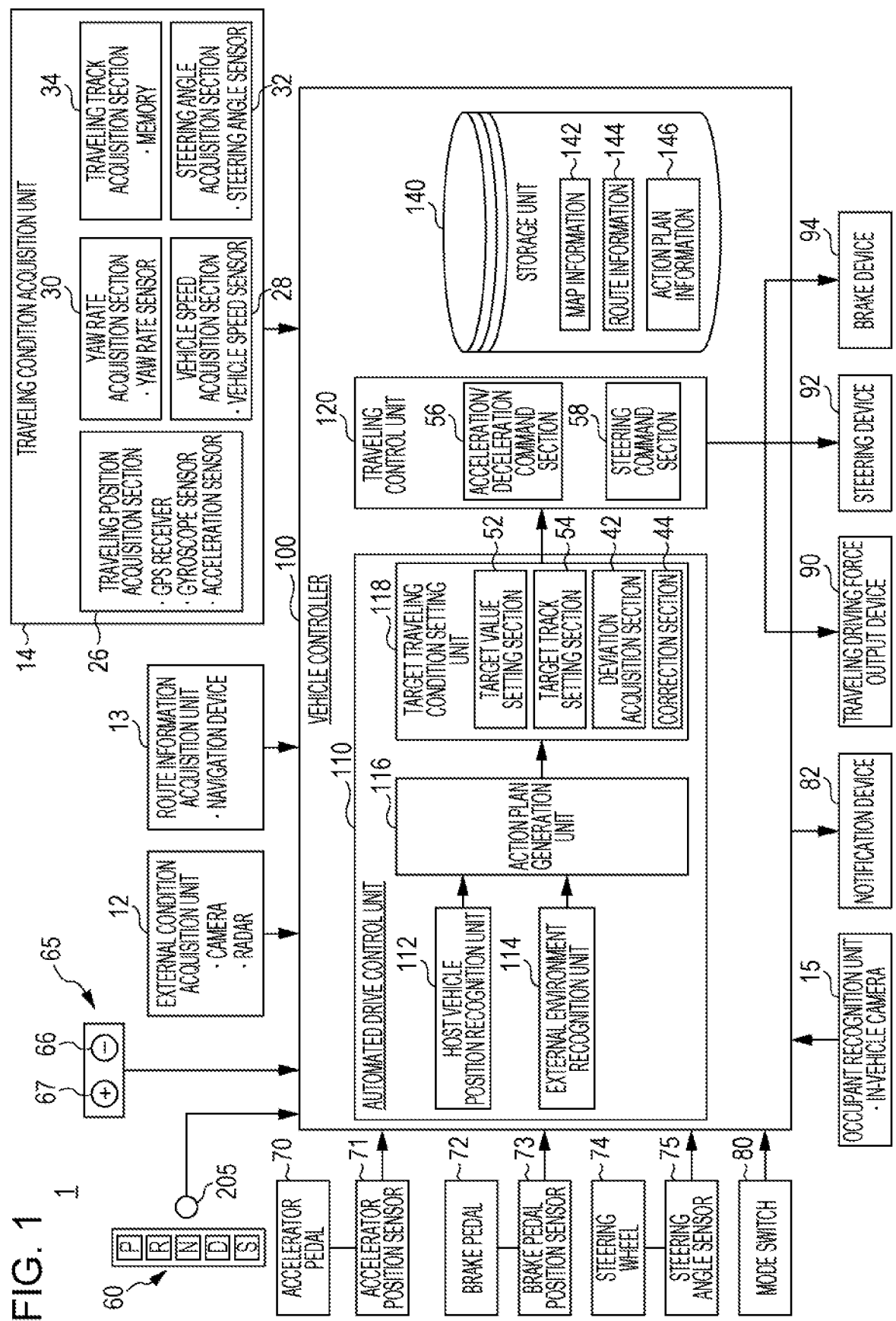
FIG. 1 is a functional configuration diagram of a vehicle controller of an embodiment of the present invention.

In the following, embodiments of the present invention are described with reference to the accompanying drawings. FIG. 1 is a functional configuration diagram of a controller 100 mounted on a vehicle 1. A configuration of the controller 100 is described, using FIG. 1. The vehicle (host vehicle) 1 on which the controller 100 is mounted is, for example, an automobile such as a two-wheel, three-wheel, or four-wheel vehicle, and includes an automobile powered by an internal-combustion engine such as a diesel engine or a gasoline engine, an electric vehicle powered by an electric motor, a hybrid automobile combining the internal-combustion engine and the electric motor, or the like. In addition, the aforementioned electric vehicle is driven by using electric power discharged by a battery such as a secondary cell, a hydrogen fuel cell, a metal fuel cell, an alcohol fuel cell, or the like.

The controller 100 includes a device, such as an external condition acquisition unit 12, a route information acquisition unit 13, a traveling condition acquisition unit 14, or the like, for capturing various types of information from outside of the vehicle 1. The controller 100 also includes an operating device such as an accelerator pedal 70, a brake pedal 72, a steering wheel 74, and a mode switch 80; an operation detection sensor such as an accelerator position sensor 71, a brake pedal position sensor (brake switch) 73, and a steering angle sensor (or a steering torque sensor) 75; a notification device (output unit) 82; and an occupant recognition unit (in-car camera) 15. In addition, as a device for performing driving or steering of the vehicle 1, the vehicle 1 includes a traveling driving force output device (drive device) 90, a steering device 92, a brake device 94, as well as the controller 100 for controlling them. These devices or instruments are connected with each other via a multiplex communication line such as CAM (Controller Area Network), a serial communication line, a wireless communication network, or the like. Note that the operation devices exemplarily illustrated are merely an example, and that a button, a dial switch, a GUI (Graphical User interface) switch, or the like may also foe mounted on the vehicle 1.

The external condition acquisition unit 12 is configured to acquire environmental information around the vehicle such as external conditions of the vehicle 1, for example, a traffic lane on a traveling road or an object around the vehicle. The external condition acquisition unit 12 includes, for example, various types of cameras (monocular camera, stereo camera, infrared camera, or the like) or various types of radars (millimeter-wave radar, microwave radar, laser radar, or the like). In addition, a fusion sensor that integrates information acquired by a camera with that acquired by a radar can be used.

The route information acquisition unit 13 includes a navigation device. The navigation device has a GNSS (Global Navigation Satellite System) receiver or map information (navigation map), a touch-panel type display device that functions as a user interface, a speaker, a microphone, or the like. The navigation device identifies a position of the vehicle 1 by the GNSS receiver, and derives from that position a route to a destination specified by a user. The route derived by the navigation device is stored as route information 144 in a storage unit 140. The position of the vehicle 1 may be identified or complemented by an INS (Inertial Navigation System) that uses output from the traveling condition acquisition unit 14. The navigation device also gives a guidance on the route leading to the destination by voice or through navigation display when the controller 100 is performing a manual drive mode. Note that a configuration for identifying the position of the vehicle 1 may be provided independently of the navigation device. The navigation device may also be implemented by a function of terminal equipment such as a smart phone or a tablet terminal held by the user. In this case, information is transmitted and received between the terminal equipment and the controller 100 via wireless or wired communications.

The traveling condition acquisition unit 14 is configured to acquire a current traveling condition of the vehicle 1. The traveling condition acquisition unit 14 includes a traveling position acquisition section 26, a vehicle speed acquisition section 28, a yaw rate acquisition section 30, a steering angle acquisition section 32, and a traveling track acquisition section 34.

The traveling position acquisition section 26 is configured to acquire a traveling position and posture of the vehicle 1 (direction of movement), which is one of the traveling conditions. The traveling position acquisition section 26 includes various types of positioning devices such as a device (GPS receiver, GNSS receiver, beacon receiver, or the like) that receives an electromagnetic wave transmitted from a satellite or a road device, for example, to acquire positional information (latitude, longitude, altitude, coordinates, or the like), or a gyroscope sensor, or an acceleration sensor, or the like. The traveling position of the vehicle 1 is measured based on a specific region of the vehicle 1.

The vehicle speed acquisition section 28 is configured to acquire a speed of the vehicle 1 (referred to as a vehicle speed), which is one of the traveling conditions. The vehicle speed acquisition section 28 includes a speed sensor, or the like, provided on one or more wheels, for example.

The yaw rate acquisition section 30 is configured to acquire a yaw rate of the vehicle 1, which is one of the traveling conditions. The yaw rate acquisition section 30 includes a yaw rate sensor, or the like, for example.

The steering angle acquisition section 32 is configured to acquire a steering angle, which is one of the traveling conditions. The steering angle acquisition section 32 includes a steering angle sensor, or the like, provided on a steering shaft, for example. Here, a steering angle speed and steering angle acceleration are also acquired based on the acquired steering angle.

The traveling track acquisition section 34 is configured to acquire information on an actual traveling track (actual traveling track) of the vehicle 1, which is one of the traveling conditions. The actual traveling track includes a track (trajectory) on which the vehicle 1 actually traveled and may include a scheduled track on which the vehicle will travel from now, for example, an extension line on the front side of the direction of movement of the travelled track (trajectory). The traveling track acquisition section 34 includes a memory. The memory stores the positional information of a series of dot sequences included in the actual traveling track. In addition, the extension line can be predicted by a computer, or the like.

The accelerator position sensor 71, the brake pedal position sensor 73, the steering angle sensor 75, which are the operation detection sensor, output to the controller 100 accelerator position, a brake pedal position, and the steering angle as a detection result.

The mode switch 80 is a switch to be operated by an occupant of the vehicle 1. The mode switch 80 receives an operation of the occupant, and switches a drive mode (for example, an automated drive mode and the manual drive mode) based on content of the received operation. For example, from the content of the operation of the occupant, the mode switch 80 generates a drive mode specification signal that specifies the drive mode of the vehicle 1, and outputs it to the controller 100.

In addition, the vehicle 1 of the embodiment includes a shift device 60 to be operated by the driver via a shift lever. As shown in FIG. 1, positions of the shift lever (not shown) in the shift device 60 include P (parking), R (reverse travel), N (neutral), D (advance travel in an automatic gear shift mode (normal mode)), S (advance travel in a sports mode), or the like. A shift position sensor 205 is provided in the vicinity of the shift device 60. The shift position sensor 205 detects a position of the shift lever to be operated by the driver. Information on a shift position detected by the shift position sensor 205 is inputted to the controller 100. Note that, in the manual drive mode, the information on the shift position detected by the shift position sensor 205 is directly outputted to a traveling driving force output device 90 (AT-ECU5).

In addition, the vehicle 1 of the present invention includes a paddle switch 65 provided in the vicinity of the steering wheel 74. The paddle switch 65 includes a – switch (minus button) 66 for instructing shift-down in a manual gear shift mode during the manual drive (manual, drive mode) and a + switch (plus button) 67 for instructing shift-up in the manual gear shift mode. In the manual gear shift mode (manual mode) of an automatic transmission TM in the manual drive mode, operation signals of these minus button 66 and plus button 67 are outputted to the controller 100, and up-shift or down-shift of a gear position set by the automatic transmission TM according to the traveling condition of the vehicle 1 is performed. Note that in the embodiment, during the manual drive, if the driver operates any of the minus button 66 and the plus button 67 when the automatic gear shift mode is set and the shift lever is positioned in a D range or an S range, the automatic gear shift mode is switched to the manual gear shift mode (manual mode).

The notification device 82 is various types of devices capable of outputting information. The notification device 82 outputs information for prompting the occupant of the vehicle 1 to shift from the automated drive mode to the manual drive mode. As the notification device 82, at least one of the speaker, a vibrator, the display device, and a light-emitting device, or the like, for example, is used.

The occupant recognition unit 15 includes the in-car camera capable of imaging interior of a passenger compartment of the vehicle 1, fox example. The in-car camera may be, for example, a digital camera utilizing an individual image pickup device such as a CCD or a CMOS, or a near-infrared camera combined with a near-infrared light source. The controller 100 acquires an image shot by the in-car camera and can recognize a current driver of the vehicle 1 from an image of a face of the driver of the vehicle 1 included in the image.

Figure 2:
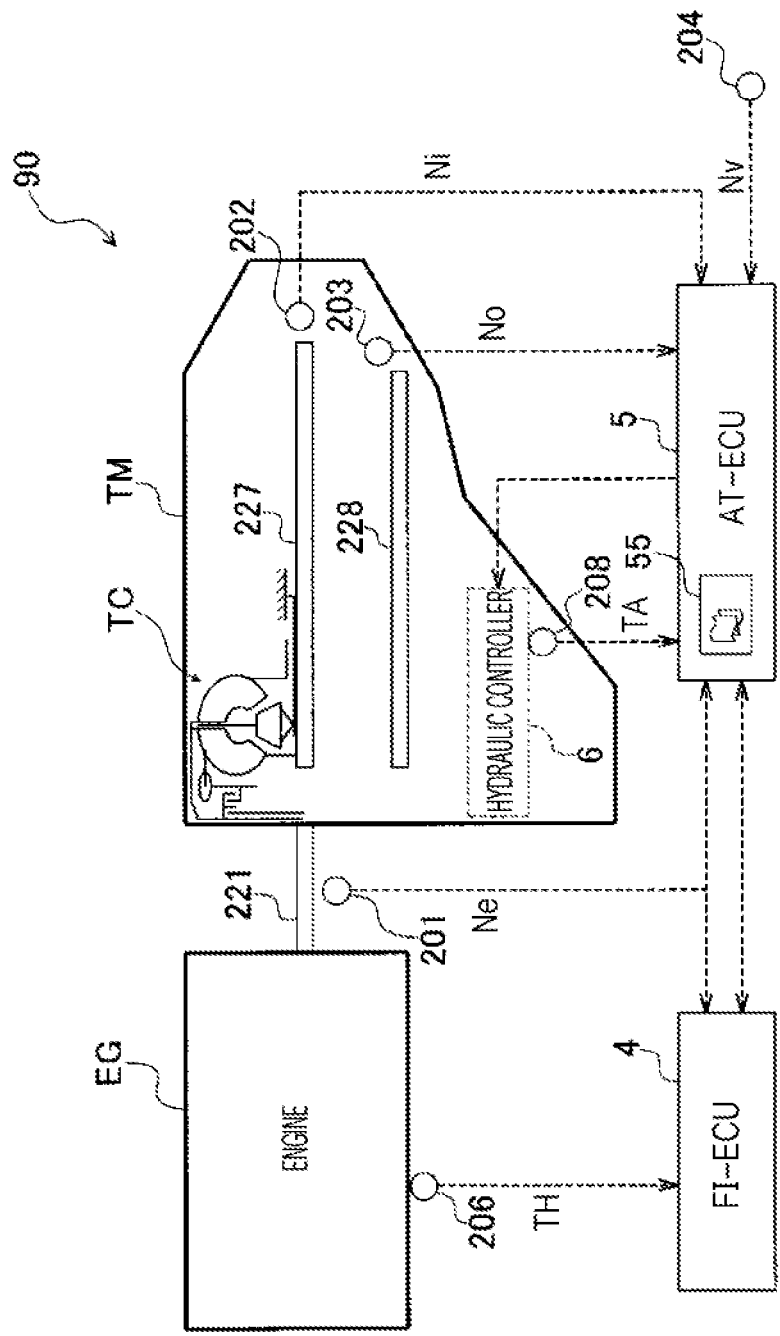
FIG. 2 is a schematic diagram illustrating a configuration of a traveling driving force output device (drive device) of the vehicle.

In the vehicle 1 of the embodiment, as shown in FIG. 2, the traveling driving force output device (drive device) 90 includes an engine EG, an FI-ECU (Electronic Control Unit) 4 that controls the engine EG, the automatic transmission TM, and the AT-ECU5 that controls the automatic transmission TM. Note that in addition to them, the traveling driving force output device 90 may also include a traction motor and a motor ECU that controls the traction motor, if the vehicle 1 is the electric vehicle powered by the electric motor. The traveling driving force output device 90 may also include the engine, the engine ECU, the traction motor, and the motor ECU, if the vehicle 1 is the hybrid automobile. If the traveling driving force output device 90 includes the engine EG and the automatic transmission TM, as in this embodiment, the FI-ECU 4 and the AT-ECU 5 control a throttle position of the engine EC or shift position of the automatic transmission TM, or the like, following information inputted from a traveling control unit 120, to be described below, and. outputs traveling driving force (torque) for the vehicle 1 to travel. In addition, if the traveling driving force output device 90 includes the traction motor only, the motor ECU adjusts a duty ratio of a PWM signal to be provided to the traction motor, according to the information inputted from the traveling control unit 120, and outputs the aforementioned traveling driving force. In addition, the traveling driving force output device 90 includes the engine and the traction motor, both the FI-ECU and the motor ECU cooperate with each other to control the traveling driving force, according to the information inputted from the traveling control unit 120.

The steering device 92 includes the electric motor, for example. The electric motor causes a force to act on a rack-and-pinion mechanism to change orientation of a turning wheel. The steering device 92 drives the electric motor according to the information inputted from the traveling control unit 120 to change the orientation of the turning wheel.

The brake device 94 is an electric brake device including, for example, a brake caliper, a cylinder transmitting hydraulic pressure to the brake caliper, the electric motor for generating the hydraulic pressure in the cylinder, and a braking control unit. The braking control unit of the electric servo brake device controls the electric motor according to the information inputted from the traveling control unit 120, so that brake torque (braking force output device) that outputs a braking force according to a braking operation is outputted to each wheel. The electric servo brake device may include, as a backup, a mechanism for conveying the hydraulic pressure generated through the operation of the brake pedal 72 to the cylinder via a master cylinder. Note that the brake device 94 is not limited to the electric servo brake device as described above, and may be an electronically controlled brake device. The electronically controlled brake device controls an actuator according to the information inputted from the traveling control unit 120, and conveys the hydraulic pressure of the master cylinder to the cylinder. In addition, if the traveling driving force output device 90 includes the traction motor, the brake device 94 may include a regeneration brake by the traction motor.

Next, the controller 100 is described. The controller 100 includes an automated drive control unit 110, the traveling control unit 120, and the storage unit 140. The automated drive control unit 110 includes a host vehicle position recognition unit 112, an external environment recognition unit 114, an action plan generation unit 116, and a target traveling condition setting unit 118. Each unit of the automated drive control unit 110 and some or all of the traveling control unit 120 are implemented by a processor such as a CPU (Central Processing Unit), or the like executing a program. Some or all of them may also be implemented by hardware such as an LSI (Large Scale Integration) or an ASIC (Application Specific Integrated Circuit). In addition, the storage unit 140 is implemented by a ROM (Read Only Memory), a RAM (Random Access Memory), an HDD (Hard Disk Drive), or a flash memory, or the like. The program executed by the processor may be stored in advance in the storage unit 140 or downloaded from an external device via an onboard Internet equipment, or the like. The program may also be installed in the storage unit 140 by a portable storage medium which stores that program being attached to a drive device (not shown). In addition, the controller 100 may foe distributed to a plurality of computer devices. This allows the aforementioned hardware functional units and software including the program, or the like, to work together on the on-board computer of the vehicle 1 to implement various types of processing in the embodiment.

The automated drive control unit 110 switches the drive mode according to input of the signal from the mode switch 80 to perform the control. The drive mode includes the drive mode (automated drive mode) that automatically controls acceleration/deceleration and steering of the vehicle 1, or the drive mode (manual drive mode) that controls the acceleration/deceleration of the vehicle 1 according to an operation on the operating device such as the accelerator pedal 70 or the brake pedal 72 and controls the steering according to the operation on the operating device such as the steering wheel 74, or the like. However, the drive mode is not limited thereto. Other drive modes may also include the drive mode (semi-automated drive mode) that automatically controls one of the acceleration/deceleration and the steering of the vehicle 1 and controls the other according to the operation on the operating device. Note that in the following description, "automated drive" includes the semi-automated drive mode, in addition to the automated drive mode described above.

Incidentally, under execution of the manual drive mode, the automated drive control unit 110 may stop the operation so that an input signal from the operation detection sensor is outputted to the traveling control unit 120 or directly supplied to the traveling driving force output device 90 (FI-ECU or AT-ECU), the steering device 92, or the brake device 94.

The host vehicle position recognition unit 112 of the automated drive control unit 110 recognizes the traffic lane (traveling lane) on which the vehicle 1 is traveling and a relative position of the vehicle 1 to the traveling lane, based on the map information 142 stored in the storage unit 140 and information inputted from the external condition acquisition unit 12, the route information acquisition unit 13, or the traveling condition acquisition unit 14. The map information 142 is, for example, the map information of higher precision than the navigation map the route information acquisition unit 13 has, and includes information on the center of the traffic lane or information on a border of the traffic lane. To be more specific, the map information 142 includes road information, traffic regulation information, address information (address/postal code), facility information, telephone number information, or the like. The road information includes information on a road type such as an expressway, a toll road, a national road, or a prefectural road, and information on the number of traffic lanes, width of each traffic lane, road inclination, a road position (three-dimensional coordinate including longitude, latitude, and altitude), curvature of a traffic lane curve, positions of merging and branching points of the traffic lane, signs provided on the road, or the like. The traffic regulation information includes information on traffic lane being blocked due to roadwork or a traffic accident, traffic jams, or the like.

The host vehicle position recognition unit 112 recognizes, as the relative position of the vehicle 1 to the traveling lane, deviation of a benchmark (center of gravity, for example) of the vehicle 1 from the center of the traveling lane, and an angle made to a centerline of the traveling lane in the direction of movement of the vehicle 1. Note that instead of this, the host vehicle position recognition unit 112 may recognize, as the relative position of the vehicle 1 to the traveling lane, apposition of the benchmark of the vehicle 1 to any side edge part, of an own traffic lane.

The external environment recognition unit 114 recognizes such conditions as a position, a speed, acceleration, or the like of a surrounding vehicle, based on the information inputted from the external condition acquisition unit 12. The surrounding vehicle referred in this embodiment is other vehicle that travels around the vehicle 1, and the vehicle that travels in a same direction as the vehicle 1 does. The position of the surrounding vehicle may be represented by a representative point such as the center of gravity of the vehicle 1 or a corner, or may be represented by an area expressed by an outline of the vehicle 1. The "conditions" of the surrounding vehicle may include the acceleration of the surrounding vehicle, and whether or not it is changing the traffic lane (or is trying to change the traffic lane). In addition, the external environment recognition unit 114 may also recognize a position of a guardrail, a power pole, a parked vehicle, a passenger, or other object, in addition to the surrounding vehicle.

The action plan generation unit 116 sets a starting point of the automated drive, a scheduled end point of the automated drive, and/or a destination of the automated drive. The starting point of the automated drive may be a current position of the vehicle 1 or a spot where the occupant of the vehicle 1 performs an operation to instruct the automated drive. The action plan generation unit 116 generates an action plan in a section between the starting point and the scheduled end point or in a section between the starting point and the destination of the automated drive. Note that the action plan generation unit 116 is not limited thereto and may generate the action plan for any section.

The action plan may include a plurality of events that are sequentially performed, for example. The events include a deceleration event that decelerates the vehicle 1, an acceleration event that accelerates the vehicle 1, a lane-keep event that causes the vehicle 1 to travel so as not to deviate from the traveling lane, a lane-change event that changes the traveling lane, an over take-event that causes the vehicle 1 to overtake a front traveling vehicle, a branch event that causes the vehicle 1 to change to a desired traffic lane at a branch point or to travel so as not to deviate from the current traveling lane, a merging event that causes the vehicle 1 to accelerate/decelerate in a merging lane for merging to a main lane and to change the traveling lane, or the like. For example, there exists a junction (branch point) in the toll road (expressway, or the like, for example), the controller 100 changes or keeps the traffic lane so that the vehicle 1 moves in a direction toward the destination. Therefore, if the action plan generation unit 116 refers to the map information 142 and finds out that the junction is present on the route, from the current position (coordinate) of the vehicle 1 till the position (coordinate) of the junction, the action plan generation unit 116 sets the lane-change event for changing the traffic line to a desired traffic lane on which the vehicle 1 can move to the direction toward the destination. Note that information showing the action plan generated by the action plan generation unit 116 is stored as action plan information 146 in the storage unit 140.

The target traveling condition setting unit 118 is configured to set a target traveling condition, which is a traveling condition targeted by the vehicle 1, based on the action plan determined by the action plan generation unit 116, and various types of information acquired from the external condition acquisition unit 12, the route information acquisition unit 13, and the traveling condition acquisition unit 14. The target traveling condition setting unit 118 includes a target value setting section 52 and a target track setting section 54. The target traveling condition setting unit 118 also includes a deviation acquisition section 42 and a correction section 44.

The target value setting section 52 is configured to set information on the traveling position (latitude, longitude, altitude, coordinates, or the like) targeted by the vehicle 1, information on a target value of the vehicle speed (which may be simply referred to as a target vehicle speed), and information on a target value of the yaw rate (which may be simply referred to as a target yaw rate). The target track setting section 54 is configured to set information on a target track of the vehicle 1 (which may be simply referred to as a target track) based on the external conditions acquired by the external condition acquisition unit 12 and the traveling route information acquired by the route information acquisition unit 13. The target track includes information on the target position per unit time. Each target position is associated with posture information (direction of movement) of the vehicle 1. In addition, each target position may be associated with the target value information such as the vehicle speed, the acceleration, the yaw rate, lateral acceleration G, the steering angle, steering angular speed, steering angular acceleration, or the like. The aforementioned target position, target vehicle speed, target yaw rate, and target track are information showing the target traveling condition.

The deviation acquisition section 42 is configured to acquire a deviation of an actual traveling condition to the target traveling condition, based on the target traveling condition set by the target traveling condition setting unit 118 and the actual traveling condition acquired by the traveling condition acquisition unit 14.

The correction section 44 is configured to correct the target traveling condition according to a deviation acquired by the deviation acquisition section 42. Specifically, as the deviation increases, the correction section 44 brings the target traveling condition set by the target traveling condition setting unit 118 close to the actual traveling condition acquired by the traveling condition acquisition unit 14 and sets a new target traveling condition.

The traveling control unit 120 is configured to control traveling of the vehicle 1. Specifically, the traveling control unit 120 outputs a command value for traveling control so that the traveling condition of the vehicle 1 equals or is brought close to the target traveling condition set by the target traveling condition setting unit 118 or the new target traveling condition set by the correction section 44. The traveling control unit 120 includes an acceleration/deceleration command section 56 and a steering command section 58.

The acceleration/deceleration command section 56 is configured to perform acceleration/deceleration control of the traveling control of the vehicle 1. Specifically, the acceleration/deceleration command section 56 computes an acceleration/deceleration command value so as to make the traveling condition of the vehicle 1 equal the target traveling condition, based on the target traveling condition (target acceleration/deceleration) and the actual traveling condition (actual acceleration/deceleration) which are set by the target traveling condition setting unit 118 or the correction section 44.

The steering command section 58 is configured to perform the steering control of the traveling control of the vehicle 1. Specifically, the steering command section 58 computes a steering angular speed command value so as to make the traveling condition of the vehicle 1 equal the target traveling condition, based on the target traveling condition and the actual traveling condition which are set by the target traveling condition setting unit 118 or the correction section 44.

FIG. 2 is a schematic diagram illustrating a configuration of the traveling driving force output device (drive device) 90 that the vehicle 1 includes. As shown in FIG. 2, the traveling driving force output device 90 of the vehicle 1 of the embodiment includes the internal-combustion engine (engine) EG, which is the driving source, and the automatic transmission TM connected to the engine EG via a torque converter TC with a lockup clutch. The automatic transmission TM is a transmission that varies the speed of the rotation caused by the driving force transmitted from the engine EG to output it to a drive wheel side, and is a stepwise variable automatic transmission capable of setting a plurality of gear positions for forward traveling and one gear position for reverse traveling. In addition, the traveling driving force output device 90 includes the FI-ECU (fuel injection controller) 4 that electronically controls the engine EG; the AT-ECU (automatic gear shift controller) 5 that automatically controls the automatic transmission TM including the torque converter TC; and a hydraulic controller 6 that hydraulically controls rotation driving or lockup control of the torque converter TC according to the control of AT-ECU5 and fastening (engagement)/release of a plurality of friction engagement mechanisms included in the automatic transmission TM.

Rotation output of the engine EG is outputted to a crankshaft (output shaft of the engine EG) 221, and conveyed to an input shaft 227 of the automatic transmission TM via the torque converter TC.

A crankshaft rotation speed sensor 201 for detecting a rotation speed Ne of the crankshaft 221 (engine EG) is provided. In addition, an input shaft rotation speed sensor 202 for detecting a rotation speed Ni of the input shaft 227 (input shaft rotation speed of the automatic transmission TM) is provided. In addition, an output shaft rotation speed sensor 203 for detecting a rotation speed No of the output, shaft 228 (output shaft rotation speed of the automatic transmission TM) is provided. Vehicle speed data calculated from the rotation speed data Ne, Ni, No, and No detected by the respective sensors 201 to 203 is provided to the AT-ECU5. The engine rotation speed data Ne is also provided to the FI-ECU (fuel injection controller) 4. In addition, a throttle position sensor 206 for detecting throttle position TH of the engine EG is provided. Data on the throttle position TH is provided to the FI-ECU4.

In addition, AT-ECU 5 that controls the automatic transmission TM has a shift map (gear shift characteristics) 55 that defines areas for the gear positions settable by the automatic transmission TM, according to the vehicle speed detected by the vehicle speed sensor and the accelerator position detected by the accelerator position sensor 71. The shift map 55 includes an upshift line and downshift line set for each of the gear positions, and a plurality of types of shift maps having different characteristics are prepared in advance. In the gear shift control of the automatic transmission TM, the AT-ECU5 performs control to switch the gear positions of the automatic transmission TM according to the shift map selected from the plurality of types of shift maps.

[Overview of Manual Drive Control]

In the vehicle 1, if the manual drive mode is selected, conventional control of the vehicle 1 (control of acceleration/deceleration and steering) according to the operation of the driver without going through the automated drive control unit 110 is performed. In the manual drive mode, detection information detected of the accelerator position sensor 71, which is the operation detection sensor, is directly inputted to the FI-ECU4 or the AT-ECU5 of the traveling driving force output device 90. The FI-ECU4 or the AT-ECU5 controls the engine EG and the automatic transmission TM (hydraulic controller 6) based on the detection information. In addition, the brake device 94 is controlled based on detection information of the brake pedal position sensor 73. With these, the acceleration/deceleration of the vehicle is controlled. In addition, the steering device 92 is controlled based on detection information of the steering angle sensor 75. With this, the steering of the vehicle is performed.

[Overview of Automated Drive Control]

In the vehicle 1, if the automated drive mode is selected through the operation of the mode switch 80 by the driver, the automated drive control unit 110 performs the automated drive control of the vehicle 1. In the automated drive control, the automated drive control unit 110 understands the current traveling condition (actual traveling track or traveling position, or the like) of the vehicle 1 based on the information acquired from the external condition acquisition unit 12, the route information acquisition unit 13, the traveling condition acquisition unit 14, or the like, or the information recognized by the host vehicle position recognition unit 112 and the external environment recognition unit 114. The target traveling condition setting unit 118 sets the target traveling condition (target track or target position), which is the traveling condition targeted by the vehicle 1, based on the action plan generated by the action plan generation unit 116. The deviation acquisition section 42 acquires the deviation of the actual traveling condition relative to the target traveling condition. The traveling control unit 120 performs the traveling control so as to make the traveling condition of the vehicle 1 equal the target traveling condition or bring the traveling condition of the vehicle 1 close to the target traveling condition, if the deviation is acquired by the deviation acquisition section 42.

The correction section 44 corrects the target track or the target position based on the traveling position acquired by the traveling position acquisition section 26. The traveling control unit 120 performs the acceleration/deceleration control of the vehicle 1 by the traveling driving force output device 90 and the brake device 94, based on the vehicle speed, or the like, acquired by the vehicle speed acquisition section, so that the vehicle 1 follows a new target track or a new target position.

In addition, the correction section 44 corrects the target track based on the traveling position acquired by the traveling position acquisition section 26. The traveling control unit 120 controls the steering by the steering device 92, based on the steering angular speed acquired by the steering angle acquisition section 32, so that the vehicle 1 follows the new target track.

[Modification and Control of Target Deceleration]

Then, the controller 100 of the vehicle 1 of the embodiment performs control (hereinafter referred to as "driving force shift control") that gradually shifts the driving force of the vehicle 1 from the driving force of the vehicle 1 in the automated drive mode to the driving force requested by the driver of the vehicle 1 in the manual drive mode, when the automated drive release request to release the automated drive mode and to switch to the manual drive mode is made while the vehicle 1 is traveling in the automated drive mode (including temporary parking time, or the like). In the following, the driving force shift control is described.

FIG. 3 is a flowchart illustrating a procedure of the driving force shift control. With reference to the flowchart of FIG. 3, the procedure of the driving force shift control is described. The driving force shift control is performed if the automated drive release request is made in the automated drive mode (ST1). Here, the automated drive release request is a request from the driver or the system of the vehicle 1, the request being to release the automated drive mode of the vehicle 1 and switch to the manual drive mode. Specifically, it is determined that the automated drive release request is made as there is any of the following: a request to switch to the manual drive mode being made by the system of the vehicle 1 according to the traveling condition of the vehicle 1 during the control in the automated drive mode; the request to switch from the automated drive mode to the manual drive mode being made as a result of the operation of the mode switch 80 by the driver; the operation of the accelerator pedal 70 of the predetermined amount or more being performed by the driver; the operation of the steering wheel 74 of the predetermined amount or more being performed by the driver; the operation of the brake pedal 72 itself being performed by the driver (irrespective of the operation amount); the operation of the paddle switch 65 (or the shift device 60) itself of the predetermined amount or more being performed by the driver.

Then, it is subsequently determined whether or not the automated drive release request in ST1 is any of the operation of the brake pedal 72 by the driver, the operation by the driver of the steering wheel 74 of the predetermined amount or more, the operation by the driver of the accelerator pedal 70 of the predetermined amount or more, and the operation of the paddle switch 65 by the driver (ST2). As a result, if the automated drive release request is any of the above operations (YES), control is performed that sets the shift rate from the driving force in the automated drive mode to the driving force in the manual drive mode (driving force requested by the driver) to the shortest time rate (ST3). If the automated drive release request is not any of the above operation (NO), the shift rate from the driving force in the automated drive mode to the driving force in the manual drive mode (driving force requested by the driver) is set to a rate at which shock noticeable by the vehicle occupant is not caused (ST4). After that, the driving force is changed based on the shift rate determined in ST3 or ST4, and the automated drive mode is shifted to the manual drive mode (ST5).

Figure 4A:
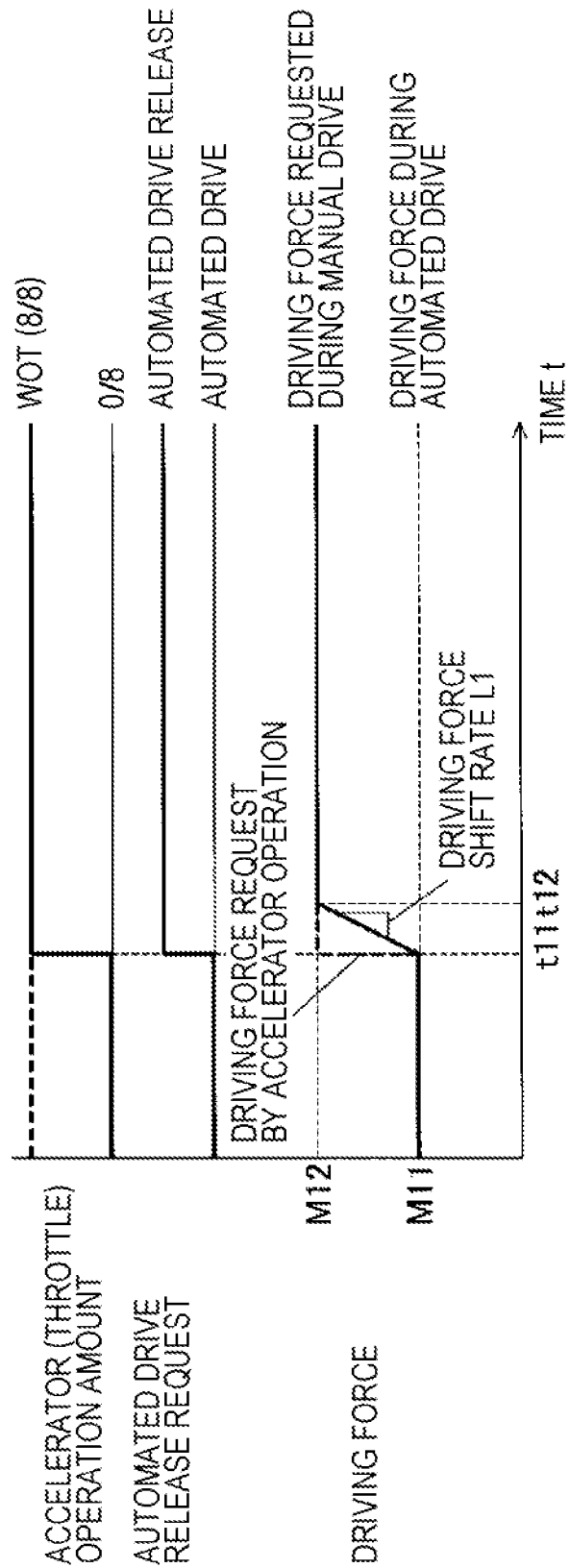
FIGS. 4A and 4B each are a graph showing a shift rate of the driving force according to an operation of an accelerator pedal.
Figure 4B:
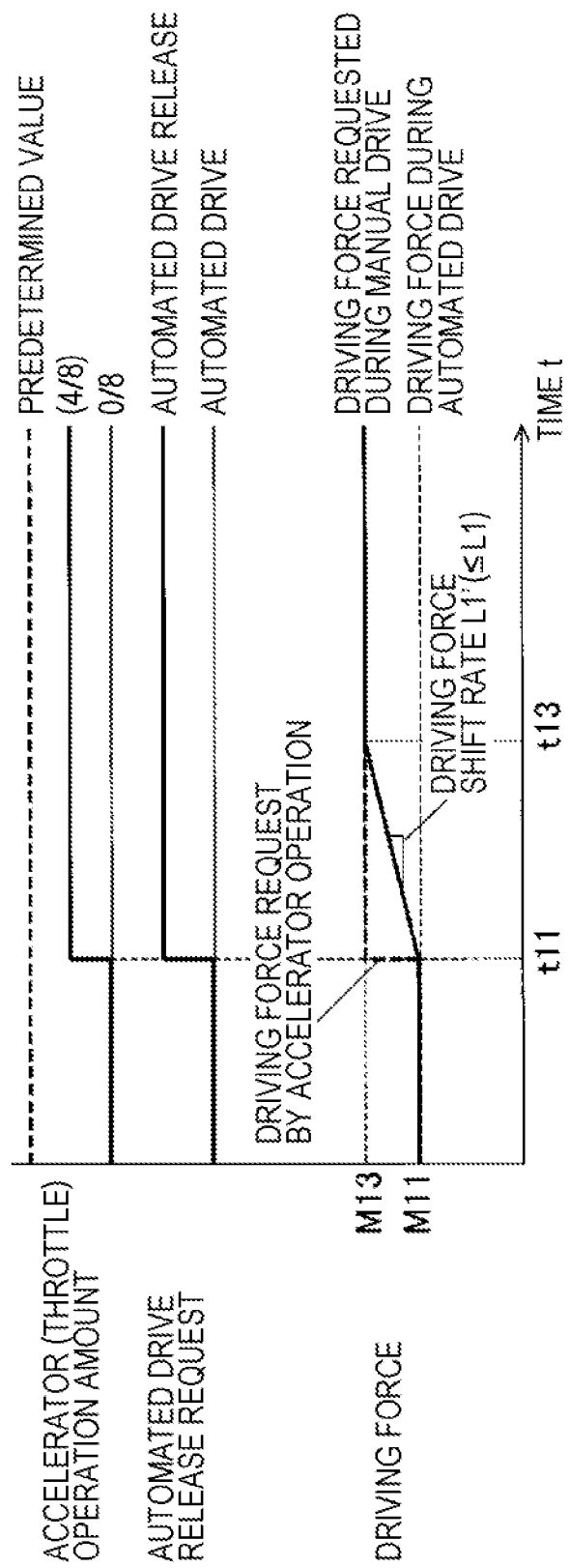

FIGS. 4A and 4B are timing charts illustrating a change of each value in the driving force shift control. FIG. 4A shows a case where the accelerator pedal 70 is operated by the predetermined amount or more. FIG. 4B shows the case where the accelerator pedal 70 is not operated by the predetermined amount or more. The timing chart of FIGS. 4A and 4B shows a change over elapsed time t of each of the operation amount of the accelerator pedal 70 (throttle of the engine EG), the automated drive release request (the presence or absence), and the driving force of the vehicle 1. First, in the timing chart of FIG. 4A, as the operation (stepping operation) of the accelerator pedal 70 is performed by the driver at time t11, the operation amount of the accelerator pedal 70 changes from 0/8 to 8/8 (WOT: Wide Open Throttle). Then, here, the predetermined amount of the operation amount of the accelerator pedal 70 is set to the operation amount 8/8. Therefore, this corresponds to the case where the operation amount of the accelerator pedal 70 is of the predetermined amount (8/8) or more. This sets the driving force M12 requested by the driver in the manual drive mode, as a request for the driving force of the vehicle 1 according to the operation of the accelerator pedal 70. Accordingly, the driving force of the vehicle 1 shifts from the driving force M11 in the automated drive mode to the driving force M12 in the manual drive mode. Then, at time t12, the shift of the driving force to the driving force M12 requested by the driver in the manual drive mode is completed. At this time, the shift rate L1=(M12-M11)/(t12-t11) is the shortest time rate as described above.

On the other hand, in the timing chart of FIG. 4B, as the stepping operation of the accelerator pedal 70 is performed by the driver at time t11, the operation amount of the accelerator pedal 70 changes from 0/8 to 4/8. This corresponds to the case where the operation amount of the accelerator pedal 70 is not the predetermined amount (8/8) or more. This sets the driving force M13 requested by the driver in the manual drive mode to the request for the driving force of the vehicle 1 according to the operation of the accelerator pedal 70. Accordingly, the driving force of the vehicle 1 shifts from the driving force M11 in the automated drive mode to the driving force M13 in the manual drive mode. Then, at time t13 (>t12), the shift of the driving force to the driving force M13 requested by the driver in the manual drive mode is completed. The shift rate L1'=(M13-M11)/(t13-t11) at this time is the rate that satisfies a relation of L1'≤L1, and the afore-mentioned rate at which the afore-mentioned shock noticeable by the vehicle occupant is not caused.

As such, in the driving force shift control of the embodiment, the driving force shift control of the embodiment performs control that gradually shifts driving force of the vehicle 1 from the driving force requested by the system of the vehicle 1 in the automated drive mode to the driving force of the vehicle 1 requested by the driver in the manual drive mode.

In addition, in the driving force shift control of the embodiment, the shift rate of the driving force is changed according to whether or not the accelerator pedal 70 (operation member) is operated by the driver by the predetermined amount or more. Specifically, if the accelerator pedal 70 is operated by the predetermined amount (8/8) or more (case in FIG. 4A), the driving force is shifted to the driving force requested by the driver of the vehicle 1 at a higher rate than in the case where the accelerator pedal 70 is not operated by the predetermined amount or more (case in FIG. 4B). In other words, if the accelerator pedal 70 is not operated by the predetermined amount (8/8) or more (case of FIG. 4B), the driving force is shifted to the driving force requested by the driver of the vehicle 1 at a rate lower than in the case where the accelerator pedal 70 is operated by the predetermined amount or more (case of FIG. 4A).

Figure 5B:
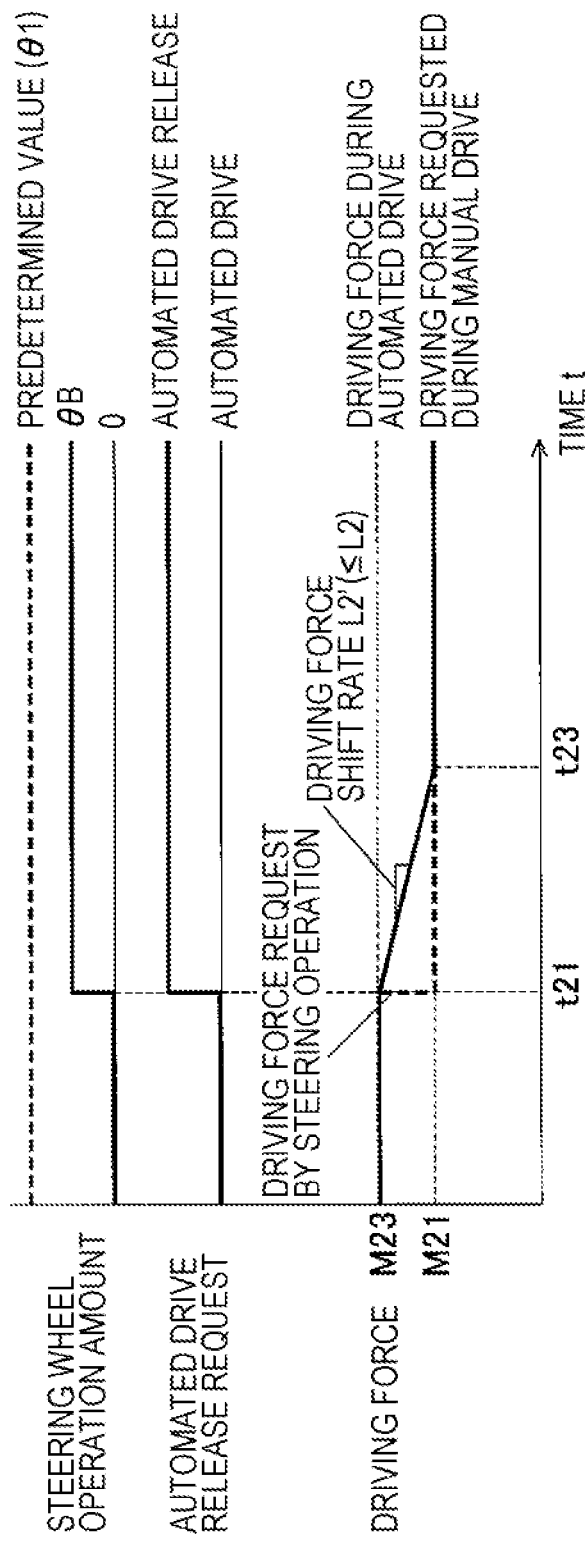

FIGS. 5A and 5B are other timing charts showing a change in each value in the driving force shift control. FIG. 5A shows the case where the steering wheel 74 is operated by the predetermined amount or more. FIG. 5B shows the case where the steering wheel 74 is not operated by the predetermined amount or more. The timing chart of FIGS. 5A and 5B shows the change in the elapsed time t of each of the operation amount of the steering wheel 74, the automated drive release request (the presence or absence), and the driving force of the vehicle 1. First, in the timing chart of FIG. 5A, as the operation of the steering wheel 74 is performed by the driver at time t21, the operation amount of the steering wheel 74 changes from 0 to the operation amount θA (≥θ1). This corresponds to the case where the operation amount of the steering wheel 74 is of the predetermined amount θ1 or more. This sets the driving force M21 requested by the driver in the manual drive mode as the request for the driving force of the vehicle 1 according to the operation of the steering wheel 74. Accordingly, the driving force of the vehicle 1 shifts from the driving force M22 in the automated drive mode to the driving force M21 in the manual drive mode. Then, at time t22, the shift of the driving force to the driving force M21 requested by the driver in the manual drive mode is completed. The shift rate at this time L2=*M22-M21)/(t22-t21) is the afore-mentioned shortest time rate.

On the other hand, in the timing chart of FIG. 5B, as the operation of the steering wheel 74 is performed by the driver at time t21, the operation amount of the steering wheel 74 changes from 0 to the operation amount θB (<θ1). This corresponds to the case where the operation amount of the steering wheel 74 is not the predetermined amount (θ1) or more. This sets the driving force M21 requested by the driver in the manual drive mode as the request for the driving force of the vehicle 1 according to the operation of the steering wheel 74. Accordingly, the driving force of the vehicle 1 shifts from the driving force M23 in the automated drive mode to the driving force M21 in the manual drive mode. Then, at time t23 (>t22), the shift of the driving force to the driving force M21 requested by the driver in the manual drive mode is completed. The shift rate at this time L2'=(M23-M21)/(t23-t21) is the rate that satisfies the relation of L2'≤L2 and the rate at which the afore-mentioned shock noticeable by the vehicle occupant is not caused.

As such, in the driving force shift control of the embodiment, the shift rate of the driving force is changed according to whether or not the steering wheel 74 (operation member) is operated by the driver by the predetermined amount (θ1) or more. Specifically, if the steering wheel 74 is operated by the predetermined amount (θ1) or more (case of FIG. 5A), the driving force is shifted to the driving force requested by the driver of the vehicle 1 at a higher rate than in the case where the steering wheel 74 is not operated by the predetermined amount or more (case in FIG. 5B). In other words, if the steering wheel 74 is not operated by the predetermined amount (θ1) or more (case of FIG. 5B), the driving force is shifted to the driving force requested by the driver of the vehicle 1 at a lower rate than in the case where the steering wheel 74 is operated by the predetermined amount or more (case of FIG. 5A).

FIGS. 6A and 6B are other timing charts showing the change in each value in the driving force shift control. FIG. 6A shows the case where the brake pedal 72 is operated. FIG. 6B shows the case where the brake pedal 72 is not operated. The timing chart of FIGS. 6A and 6B shows the change over the elapsed time t of each of the operation of the brake pedal 72 (with or without operation), the automated drive release request (the presence or absence), and the driving force of the vehicle 1. First, in the timing chart of FIG. 6A, as the operation of the brake pedal 72 (stepping operation) is performed by the driver at time t31, the brake pedal 72 is operated. This sets the driving force M31 requested by the driver in the manual drive mode as the request for the driving force of the vehicle 1 according to the operation of the brake pedal 72. Accordingly, the driving force of the vehicle 1 shifts from the driving force M32 in the automated drive mode to the driving force M31 in the manual drive mode. Then, at time t32, the shift of the driving force to the driving force M31 requested by the driver in the manual drive mode is completed. The shift rate at this time L3=(M32-M31)/(t32-t31) is the afore-mentioned shortest time rate.

On the other hand, in the timing chart of FIG. 6B, the operation of the brake pedal 72 is not performed at the time t31. It is then determined that the automated drive release request is made, due to any reason other than the operation of the brake pedal 72, such as, for example, at the time t31, the request to switch to the automated drive mode being issued from the system of the vehicle 1 or the request to switch from the automated drive mode to the manual drive mode being issued due to the operation of the mode switch 80 by the driver, or the like. This sets the driving force M31 requested by the drive in the manual drive mode as the request for the driving force of the vehicle 1 based on the automated drive release request. Accordingly, the driving force of the vehicle 1 shifts from the driving force M33 in the automated drive mode to the driving force M31 in the manual drive mode. Then, at time t33 (>t32), the shift of the driving force to the driving force M31 requested by the driver in the manual drive mode is completed. The shift rate at this time L3' (M33-M31)/(t33-t31) is the rate that satisfies L3'≤L3, and the rate at which the afore-mentioned shock noticeable by the vehicle occupant is not caused.

As such, in the driving force shift control of the embodiment, the shift rate of the driving force is changed according to whether or not an operation, of the brake pedal 72 (operation member) is performed by the driver. Specifically, if the operation of the brake pedal 72 itself is performed (case of FIG. 6A), the driving force is shifted to the driving force requested fay the driver of the vehicle 1 at a higher rate than in the case where the operation of the brake pedal 72 itself is not performed (FIG. 6B). In other words, if the operation of the brake pedal 72 itself is not performed (case of FIG. 6B), the driving force is shifted to the driving force requested by the driver of the vehicle 1 at a lower rate than in the case where the operation of the brake pedal 72 itself is performed (case of FIG. 6A).

Figure 7A:
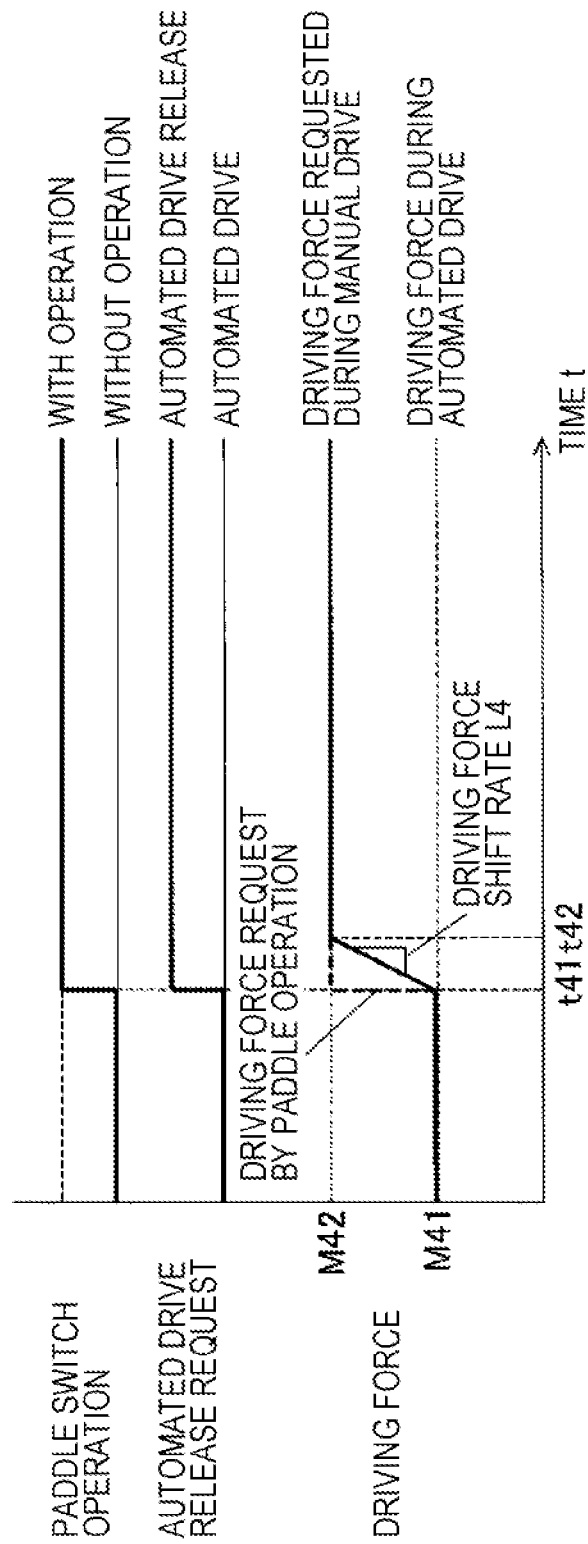

FIGS. 7A and 7B are other timing charts showing the change in each value in the driving force shift control. FIG. 7A shows the case where the paddle switch 65 is operated. FIG. 7B shows the case where the paddle switch 65 is not operated. The timing chart of FIGS. 7A and 7B shows the change in the elapsed time t of each of the operation of the paddle switch 65 (with or without operation), the automated drive release request (the presence or absence), and the driving force of the vehicle 1. First, in the timing chart of FIG. 7A, as the operation of the paddle switch 65 is performed (herein snowing the case where the operation to depress the minus button 66 is performed) at time t41, the paddle switch 65 is operated. This sets the driving force M42 requested by the driver in the manual drive mode as the request for the driving force of the vehicle 1 according to the operation of the paddle switch 65. Accordingly, the driving force of the vehicle 1 shifts from the driving force M41 in the automated drive mode to the driving force M42 in the manual drive mode. Then, at time t42, the shift of the driving force to the driving force M42 requested by the driver in the manual drive mode is completed. The shift rate at this time L4=(M42-M41)/(t42-t41) is the afore-mentioned shortest time rate.

On the other hand, in the timing chart of FIG. 7B, paddle switch 65 is not operated at the time t41. It is then determined that the automated drive release request is made, due to any reason other than the operation of the paddle switch 65, such as, for example, at the time t41, the request to switch to the automated drive mode being issued from the system of the vehicle 1 or the request to switch from the automated drive mode to the manual drive mode being made due to the operation of the mode switch 80 by the driver, or the like. This sets the driving force M43 requested by the drive in the manual drive mode as the request for the driving force of the vehicle 1 based on the automated drive release request. Accordingly, the driving force of the vehicle 1 shifts from the driving force M41 in the automated drive mode to the driving force M43 in the manual drive mode. Then, at time t43 (>t42), the shift of the driving force to the driving force M43 requested by the driver in the manual drive mode is completed. The shift rate at this time L4' (M43-M41)/(t43-t41) is a rate that satisfies L4'≤L4, and the rate at which the afore-mentioned shock noticeable by the vehicle occupant is not caused.

As such, in the driving force shift control of the embodiment, the shift rate of the driving force is changed according to whether or not the paddle switch 65 is operated by the driver. Specifically, if the operation of the paddle switch 65 itself is performed (case of FIG. 7A), the driving force is shifted to the driving force requested by the driver of the vehicle 1 at a higher rate than in the case where the operation of the paddle switch itself is not performed (FIG. 7B). In other words, if the operation of the paddle switch 65 itself is performed (FIG. 7B), the driving force is shifted to the driving force requested by the driver of the vehicle 1 at a lower rate than in the case where the operation of the paddle switch 65 itself is performed (case of FIG. 7A).

As described above, in the vehicle controller of the embodiment, the driving force is gradually (more specifically, in an amount of change having a predetermined inclination with respect to the elapsed time, rather than sharp change of the driving force at that timing) shifted from the driving force of the vehicle 1 in the automated drive mode to the driving force requested by the driver in the manual drive mode, when the automated drive release request to release the automated drive mode and switch to the manual drive mode is made while the vehicle 1 is travelling in the automated drive mode. Thus, even if there is the difference in the accelerator position in the automated drive mode and the accelerator position according to the operation of the driver in the manual drive mode, or the like, in particular, it is possible to prevent a sharp change in the driving force of the vehicle 1 from occurring when the automated drive mode is switched to the manual drive mode. Therefore, it is possible to prevent generation of large vibrations or noise in the vehicle due to the sharp change in the driving force in the shift from the automated drive to the manual drive. This allows the driver of the vehicle 1 to take over the operation of the vehicle 1 smoothly and naturally when the automated drive control switches to the manual drive control.

In addition, here, the vehicle controller includes the accelerator pedal 70, the brake pedal 72, the steering wheel 74, and the paddle switch 65, which are the operation member through which the operation for the driver to control the acceleration/deceleration or the steering of the vehicle 1 is inputted, and change the shift rate according to whether or not the operation members are operated by the driver or whether or not the operation member is operated by predetermined amount or more.

If the operation of the operation member itself is performed, or if the operation of the operation member is performed in the predetermined amount or more, the operation is likely to be a request made by the driver who desires to control steering or acceleration/deceleration of the vehicle on his/her own will immediately. Thus, it is desirable to shift to the driving force requested by the driver of the vehicle 1 in the manual drive mode at a higher rate than in the case where any of those operations does not take place. On the other hand, if the operation of the operation member itself is not performed by the driver, or if the operation of the operation member is not performed in the predetermined amount or more, if can be determined that the driver does not make such request. Thus, if is possible to smoothly shift the driving force without generating large vibrations or noise or the like in a driving force transmission path, by shifting to the driving force requested by the driver of the vehicle 1 in the manual drive mode at a lower rate than in the case where any of those operations takes place. Hence, as described above, if the shift rate is changed according to whether or not the operation of the operation member itself is performed or whether or not the operation of the operation member is performed in the predetermined amount or more, it is possible to achieve both responsiveness to the request of the driver and smooth shift of the driving force.

So far the embodiments of the present invention have been described. However, the present invention is not limited to the embodiments described above, and various modifications are possible within the scope of the technical idea described in the claims, the specification, and the drawings.

What is claimed is:

1. A vehicle controller configured to switchably perform an automated drive mode and a manual drive mode, the automated drive mode automatically controlling at least acceleration and deceleration out of steering, the acceleration and deceleration of a vehicle, the manual drive mode manually controlling the at least acceleration and deceleration out of the steering, the acceleration and the deceleration of the vehicle according to an operation by a driver, the vehicle controller comprising: a traveling control unit configured to:

output a traveling control command value including at least a vehicle driving force command value which determines a vehicle driving force to control the acceleration and deceleration, the vehicle driving force comprising a vehicle driving force requested in the automated drive mode and a vehicle driving force requested by the driver in the manual drive mode, and release the automated drive mode and switch to the manual drive mode upon detecting an automated drive release request from the driver; and an operation member operable by the driver to input an operation amount to control the acceleration and deceleration or to control the steering of the vehicle, wherein the operation member is any of: an accelerator operation member for operating an accelerator position of the vehicle; a steering operation member for operating the steering of the vehicle; a shift operation member for selecting one of traveling ranges of the vehicle; and a brake operation member for operating a brake of the vehicle, wherein when the automated drive release request is detected while the vehicle is traveling in the automated drive mode, the traveling control unit performs driving force shift control that gradually shifts the vehicle driving force requested in the automated drive mode to the vehicle driving force requested by the driver in the manual drive mode, wherein, when the operation of the operation member by the driver is detected, the traveling control unit:

determines the vehicle driving force requested by the driver in the manual drive mode according to the operation amount of the operation member inputted by the driver, and shifts the vehicle driving force to the vehicle driving force requested by the driver in the manual drive mode with a first shift rate which is higher than a second shift rate, the second shift rate being used in a case:

(i) when the operation of the operation member by the driver is not detected, and (ii) when the vehicle driving force requested in the automated drive mode is gradually shifted to the vehicle driving force requested by the driver in the manual drive mode.

2. The vehicle controller according to claim 1, wherein the vehicle controller determines that the automated drive release request is detected when the operation of the operation member is detected when the automated drive mode is selected.

3. The vehicle controller according to claim 1, wherein the operation of the operation member by the driver is an operation of the shift operation member or an operation of the brake operation member.

4. The vehicle controller according to claim 1, wherein the second shift rate is used when the automated drive release request is generated due to an event other than the operation of the operation member by the driver.

5. A method implemented by a processor configured to switchably perform an automated drive mode and a manual drive mode of a vehicle, the automated drive mode automatically controlling at least acceleration and deceleration out of steering, the acceleration and deceleration of the vehicle, the manual drive mode manually controlling the at least acceleration and deceleration out of the steering, the acceleration and the deceleration of the vehicle according to an operation by a driver, the method comprising steps of:

(i) outputting a traveling control command value including at least a vehicle driving force command value which determines a vehicle driving force to control the acceleration and deceleration, the vehicle driving force comprising a vehicle driving force requested in the automated drive mode and a vehicle driving force requested by the driver in the manual drive mode;

(ii) releasing the automated drive mode and switching to the manual drive mode upon detecting an automated drive release request from the driver, wherein when the automated drive release request is detected while the vehicle is traveling in the automated drive mode, a driving force shift control is performed that gradually shifts the vehicle driving force requested in the automated drive mode to the vehicle driving force requested by the driver in the manual drive mode, wherein, the step (ii) further comprises when an operation of an operation member by the driver is detected:

determining the vehicle driving force requested by the driver in the manual drive mode according to an operation amount of the operation member inputted by the driver, and shifting the vehicle driving force to the vehicle driving force requested by the driver in the manual drive mode with a first shift rate which is higher than a second shift rate, the second shift rate being used in a case:

(i) when the operation of the operation member by the driver is not detected, and
(ii) when the vehicle driving force requested in the automated drive mode is gradually shifted to the vehicle driving force requested by the driver in the manual drive mode, wherein the operation member is operable by the driver to input the operation amount to control the acceleration and deceleration or to control the steering of the vehicle, and wherein the operation member is any of: an accelerator operation member for operating an accelerator position of the vehicle; a steering operation member for operating the steering of the vehicle; a shift operation member for selecting one of traveling ranges of the vehicle; and a brake operation member for operating a brake of the vehicle.

* * * * *